United States Patent [19]

Bruno et al.

[11] Patent Number: 5,710,591
[45] Date of Patent: Jan. 20, 1998

[54] METHOD AND APPARATUS FOR RECORDING AND INDEXING AN AUDIO AND MULTIMEDIA CONFERENCE

[75] Inventors: Richard F. Bruno, Morristown; David C. Gibbon, Lincroft; Howard P. Katseff, Manalapan; Robert E. Markowitz, Glen Rock; Bethany S. Robinson, Colts Neck; Behzad Shahraray, Freehold; Peter H. Stuntebeck, Little Silver; Roy P. Weber, Bridgewater, all of N.J.

[73] Assignee: AT&T, Middletown, N.J.

[21] Appl. No.: 495,747

[22] Filed: Jun. 27, 1995

[51] Int. Cl.⁶ .................................................. H04N 7/15
[52] U.S. Cl. .................................................. 348/15; 379/202
[58] Field of Search ............................ 348/15, 14, 16, 348/17, 18, 19; 370/62; 379/96, 93, 94, 202, 204, 205, 206; H04N 7/15

[56] References Cited

U.S. PATENT DOCUMENTS 4,965,819 10/1990 Kannes ............................ 348/14

FOREIGN PATENT DOCUMENTS

| | | | |
|---|---|---|---|
| 617562 | 9/1994 | European Pat. Off. | H04N 7/15 |
| 619679 | 10/1994 | European Pat. Off. | H04N 7/15 |
| 405244588 | 9/1993 | Japan | H04N 7/15 |
| 406178296 | 6/1994 | Japan | H04N 7/15 |
| 406225302 | 8/1994 | Japan | H04N 7/15 |
| 406284419 | 10/1994 | Japan | H04N 7/15 |
| 94/24803 | 10/1994 | WIPO | H04N 7/15 |

*Primary Examiner*—Stella Woo
*Attorney, Agent, or Firm*—Barry Freedman

[57] ABSTRACT

A method and apparatus for recording and indexing audio information exchanged during an audio conference call, or video, audio and data information exchanged during a multimedia conference. For a multimedia conference, the method and apparatus utilize the voice activated switching functionality of a multipoint control unit (MCU) to provide a video signal, which is input to the MCU from a workstation from which an audio signal is detected, to each of the other workstations participating in the conference. A workstation and/or participant-identifying signal generated by the multipoint control unit is stored, together or in correspondence with the audio signal and video information, for subsequent ready retrieval of the stored multimedia information. For an audio conference, a computer is connected to an audio bridge for recording the audio information along with an identification signal for correlating each conference participant with that participant's statements.

33 Claims, 2 Drawing Sheets

METHOD AND APPARATUS FOR RECORDING AND INDEXING AN AUDIO AND MULTIMEDIA CONFERENCE

BACKGROUND OF THE INVENTION

I. Field of the Invention

This invention broadly relates to multimedia conferencing wherein two or more users interact visually and audibly and are able to concurrently share data such as spreadsheets, reports, etc. More particularly, the present invention pertains to multimedia conferencing in which two or more users interact with each other through the use of terminal equipment having audio and video input/output capabilities and which are typically connected to a multipoint control unit. Most particularly, the present invention is directed to a method and apparatus for recording and indexing the audio signal, data and at least a representation of the video signal that are exchanged among the participants during a multimedia conference video call and for utilizing the voice activated switching functionality of the multipoint control unit to index the recorded information for subsequent identification and retrieval. In addition, the present invention is directed to a method and apparatus for recording and indexing an audio or voice-only call wherein two or more participants interact with each other via telephone terminal devices connected to a common audio bridge.

II. Discussion of Background Art

Recent developments in telecommunications provide the capability of video calling wherein two users communicate and interact with each other over a direct transmission link or telephone line, such as an Integrated Services Digital Network (ISDN) line, via the use of terminal equipment having audio and video input/output capabilities. In general, the terminal equipment being used in video calling is a workstation containing a microphone and speaker for audio exchange, a video camera and screen for video exchange and a computer for the exchange of data which may comprise, for example, reports, spreadsheets, graphs, etc.

Video call information is commonly configured into a data string format comprised of two bearer (B) channels (with each channel carrying either 56 or 64 kilobits per second kb/s)) and a signal channel (D) of 16 kb/s; this format is commonly referred to as 2B+D. For standard data configuration most video calls utilize the H.320 video telephone protocol which configures the initially connected bearer channel to carry the portion of the data string representing all of the audio and data information (reports, spreadsheets, etc.) as well as a small potion of the video information, and configures the later-connected bearer channel to carry the remainder of the video information.

For a video call, two users can interact directly via a point-to-point connection either through a local central office for a local call, or through a main switching station for a toll call. Users can also interact indirectly via use of a multipoint control unit (MCU) wherein each workstation is connected to and shares a common MCU. When an MCU is used, such interaction is referred to as multimedia conferencing and, through the use of additional ports on the MCU, numerous additional third party users to a multimedia conference can be accommodated by connecting additional workstations to the MCU.

The basic features of an MCU are described, for example, in M. J. Koenig, et. al., "MCUs Help Take The Worry Out Of Being There", AT&T Technology Products, Systems and Services, Vol. 9, No. 4, Winter, 1994, pages 12–15, which is incorporated by reference herein. Basically, an MCU synchronizes a multiplexed data bit stream comprised of voice, video and data which originates from each workstation endpoint, ensures a compatible set of audio and video parameters for the video conference from the options communicated by the control sequences received from the other workstation endpoints, and then decodes and sums the audio streams from all users for broadcast to the conference call participants. The video displayed at each particular participants' workstation can be determined by a variety of methods such, for example, as voice-activated switching wherein the then-loudest speaker's image is seen by the other conferees while the loudest speaker's workstation displays the image of the previous speaker's location. Other video switching methods are discussed in the aforementioned Koenig article.

Since video conferencing is often used as an alternative to in-person presentations and seminars, it is highly desirable to have a capability of recording the information transmitted during a multimedia conference call for later use, such as to review what a conference participant stated about a certain subject or what files or documents were reviewed in the course of the conference. Current techniques for recording such multimedia conferences simply consist of recording the entire conference, either in an analog format for storage on a video cassette or in a digital format for storage in computer memory. However, when retrieval of certain specific information is subsequently desired from the stored file, the entire file must be scanned, in an extremely time consuming manner, to locate and obtain the information sought. In addition, and specifically in the case of computer memory storage, a relatively large amount of storage space is required and must be set aside for accommodating the video data. Thus, various video compression methods have been developed for reducing the amount of data in the video component of a signal and thereby reducing the amount of memory needed for its storage.

For example, time-based sampling compression methods have been developed wherein a frame sample of the video signal is obtained at fixed or adjustable time intervals for storage rather than the entire stream of all video frames. In addition, content-based compression or sampling methods have been developed for sampling a video signal based on the detection of scene changes that occur within individual shots. Such methods are disclosed in pending U.S. patent application Ser. No. 08/171,136, filed Dec. 21, 1993 and entitled "Method and Apparatus for Detecting Abrupt and Gradual Scene Changes in Image Sequences," and in pending U.S. patent application Ser. No. 8/191,234, filed Feb. 4, 1994, entitled "Camera-Motion Induced Scene Change Detection Method and System," the entire disclosure of each of which are incorporated by reference herein. In addition, a method for compressing a video signal and for synchronizing the compressed signal is disclosed in pending U.S. patent application Ser. No. 08/252,861, filed Jun. 2, 1994 and entitled "Method And Apparatus For Compressing A Sequence Of Information-Bearing Frames Having At Least Two Media Components," the disclosure of which is also incorporated by reference herein.

Aside from video conferencing, it is also desirable to record and index information exchanged during an audio or telephone conference call. Like a video call, in an audio call two users can interact directly through a point-to-point connection through a local central office (for a local call) or through a main switching station (for a toll call). Call participants may also interact indirectly through connection to a common audio bridge which, through the use of additional ports, can accommodate numerous additional third party participants to an audio-only conference call. As will be appreciated, recording of audio information from the conference call for subsequent retrieval is desirable.

SUMMARY OF THE INVENTION

While the aforementioned video recording techniques reduce the amount of storage space required to store the video component of a signal, no techniques have heretofore been developed in the context of video or multimedia conferencing wherein the information exchanged in a video conference, i.e. data, audio and video, can be recorded and simultaneously indexed to identify and correlate, among other things, each particular participant or conferee with the statements made by that participant. Accordingly, it would be desirable to have a method and apparatus for recording and indexing multimedia conferences and audio conferences for subsequent ready identification and retrieval of information exchanged during such conferences.

The present invention provides, inter alia, a method and apparatus for recording and indexing the participants of, and data exchanged or transmitted during, a multimedia conference, such as a video conference, wherein a plurality of users interact with a multipoint control unit (MCU) through a plurality of terminal devices having audio and video input and output capabilities. The method and apparatus utilize the voice activated switching capability of an otherwise conventional MCU, through which all of the terminal devices involved in the conference interact, to display on video screens a video signal received by a video input means at a terminal device where an audio signal is detected. When an audio signal is detected at a particular terminal device and the MCU switches between received video signals to supply to the terminal devices the video signal corresponding to the detected audio signal, a location signal which corresponds to, or represents, the address of the particular terminal device in use is recorded by a separate recording unit, such as a computer memory and, simultaneously therewith, the audio and video signals received by and/or from that terminal device are also recorded.

The method of one contemplated form of the invention comprises the steps of detecting an audio signal received by the audio input means of one of a plurality of terminal devices interacting with a multipoint control unit, providing a video signal corresponding to the detected audio signal to at least some of the terminal devices in the plurality, identifying the location of the receiving audio input means and generating a location signal representative of the identified location, and simultaneously recording the detected audio signal with the location signal.

In a preferred embodiment, the method also records either the entire video information stream or a representative sampling of the video information stream and synchronizes the recorded audio and location signal with the video information to a common time frame of reference, such as by utilizing a network clock, to accommodate ready retrieval of corresponding audio and video data along with the identity of the conference participant who entered the retrieved information.

The invention also provides apparatus for recording and indexing information exchanged during a multimedia conference having several or more participants. The apparatus includes a plurality of terminal devices each having an audio input means and a corresponding video input means, a multipoint control unit having voice-activated switching capability and which is connected to the plurality of terminal devices for providing a received video signal input to the MCU by a video input means of one of the terminal devices upon detection of an audio signal received by the corresponding audio input means of the terminal device, to at least some of the terminal devices, and means for generating a signal corresponding to or representative of a location of the detected audio signal. The apparatus also includes means for recording the generated location signal and an audio signal received by the corresponding audio input means.

In a preferred embodiment, the inventive apparatus further includes means for sampling a representative portion of the video information stream input by the video input means associated with the audio input means which inputs the detected audio signal, for synchronizing the representative portion of the video information stream to the corresponding audio signal and location signal, and for recording the synchronized information for subsequent retrieval.

In accordance with another preferred embodiment, a method is disclosed for recording and indexing audio information exchanged during an audio conference call wherein several participants interact with each other through voice-only terminal devices, such as telephones, which are connected to a common audio bridge. An identifying step determines the location of the receiving terminal device, corresponding to or identifying the currently-speaking conference participant, and a recording step records the identification along with the exchanged audio information. The recorded information is then stored for subsequent retrieval and processing.

BRIEF DESCRIPTION OF THE DRAWINGS

In the drawings, wherein like reference numerals designate like elements throughout.

DETAILED DESCRIPTION OF THE PREFERRED EMBODIMENTS

Multimedia conferencing takes place when two or more users or conferees interact via their respective workstations which include or incorporate video and audio input and output capability. The workstations are indirectly interconnected through a multipoint control unit (MCU), and information transmitted to and from the MCU through workstations typically contains components representing audio, video and data signals. One of the functions of the MCU is to control the video signal that is displayed at each users' workstation during multimedia conferences.

As explained hereinabove, the video signal can be controlled in a variety of ways. For example, a presentation mode may be used wherein the image of the presenter—who has been previously designated or identified when the conference is set up or when a reservation for the conference is made—will be seen by the other conferees (i.e. on their screens) while the presenter sees the location of a particular user's workstation who may comment on or ask questions about the presentation. Another method for controlling the video signal is a voice-activated switching mode wherein the MCU will display the image of the loudest speaking user/conferee on each of the other users' workstations while the image of the previous speaker's location will be displayed on the current speaker's screen. A more preferred voice-activated switching mode is where the MCU switches the video signal from the current speaker's location only when that speaker stops talking; in other words, the MCU will change the video display only after the current speaker stops talking and a new speaker begins talking. The voice activated switching feature of MCUs is essential to these forms of the present invention as currently contemplated.

Figure 1:
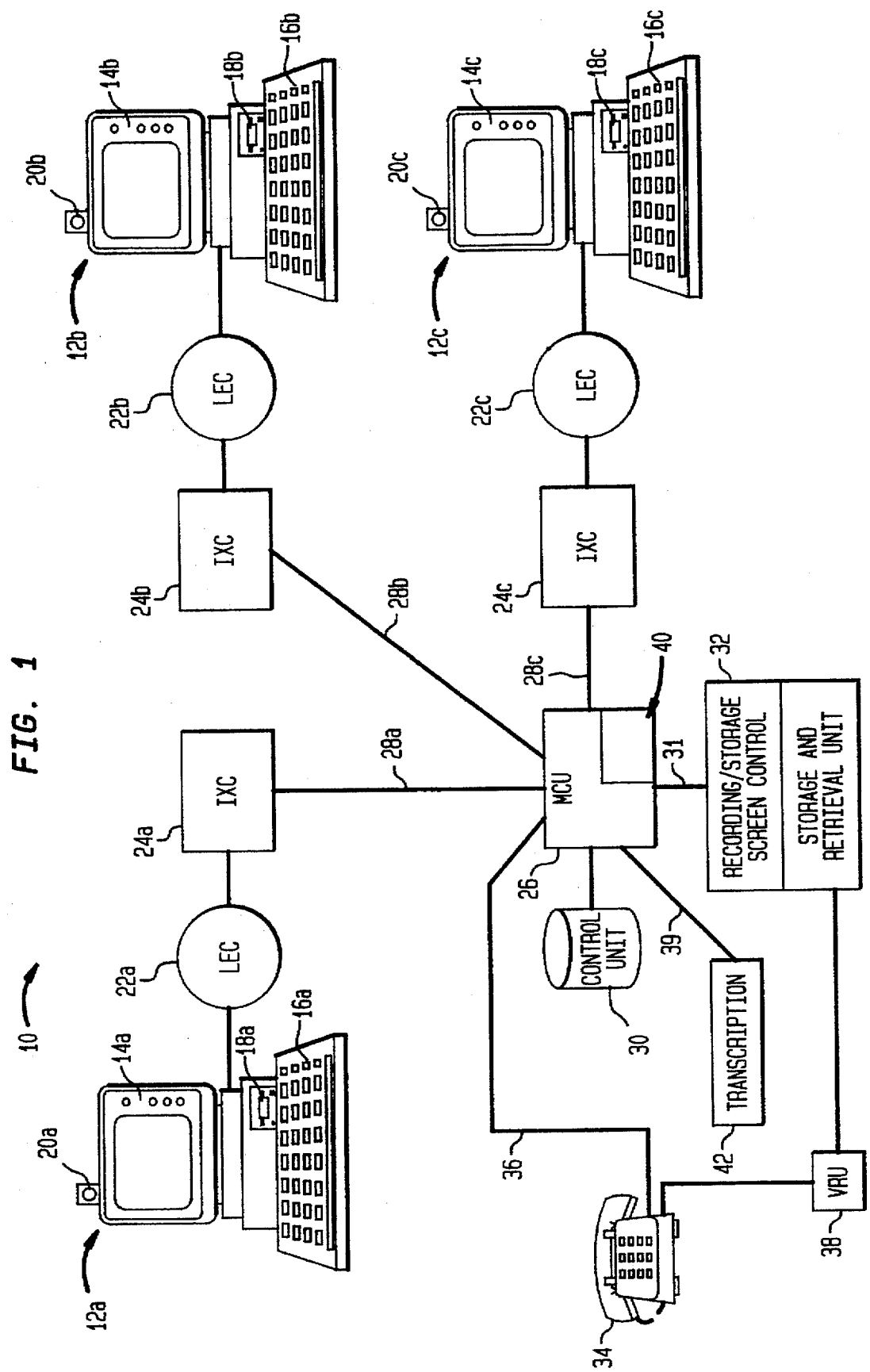
FIG. 1 is a block diagram of an apparatus for indexing and recording a multimedia conference in accordance with a preferred embodiment of the present invention.

A block representation of an apparatus 10 for recording and indexing a 3-way multimedia or video conference in accordance with the invention is depicted in FIG. 1. As there shown, three workstation terminal devices 12a, 12b and 12c interact with each other through their respective connections to a common multipoint control unit (MCU) 26. Each workstation 12 typically includes a CRT screen 14 for video output and display of data such as reports, spreadsheets, graphs etc., a keyboard 16 for entering and accessing data, audio input and output means 18 such as a microphone and/or speaker, and a video input means such as a video camera 20. Each workstation 12 is shown as connected to the MCU 26 by one of several connection lines 28 through, by way of example, a local central office or exchange 22 and a toll or long distance switching office 24. It should be understood, however, that for a local call the toll switching office 24 would not be required and a direct connection from each workstation's respective local central office 22 to the respective connection lines 28 can exist. Similarly, using privately owned local telephones lines, the workstations may be connected directly to the MCU without an interposed local central office 22. As also shown, a conference control unit 30 for controlling the operation of the MCU 26 such, for example, as by reserving the required number of MCU ports to which the lines 28 are connected is linked to the MCU.

An output of the MCU 26 is directed on a silent leg output line 31 to a digital computer 32 for storing or recording the video, audio and data information that is exchanged during a particular multimedia conference call so that the information can be subsequently retrieved and processed therefrom. The computer 32 operates software for recording and storing the audio, video and data signals which are provided to the MCU 26 during a conference.

As discussed above, MCU 26 utilizes voice activated switching to select video information received by a particular video camera 20 which corresponds to or is associated with an audio input means 18 that receives a detected audio signal. Thus, during a multimedia conference call, wherein audio video signals are constantly fed to the MCU by each video camera 20, the MCU will display on the workstation screens 14 only the video information that is received by the video camera 20 associated with the audio input means which inputs the detected audio signal. For example, if a user at device 12a begins speaking, that user's voice will be detected by the MCU 26 which will then provide the video information received by the MCU via camera 20a to the other user's screens (14b and 14c). The displayed video image is typically the image of the speaker. When the MCU 26 no longer receives or detects an audio signal from workstation 12a and a new audio signal is detected at a different workstation 12b or 12c, the MCU will then cease displaying the video information input by video camera 20a and will commence to display the video information received by the video camera associated with the location of the newly-detected audio signal. That image will, likewise, be displayed on each of the other connected workstations in the conference call. For synchronized switching and other operations, the MCU 26 may also include a clock input 40 for receipt of a clock signal which is, preferably, generated in a network to which the MCU 26 is connected.

When the information exchanged during a multimedia conference call is recorded by the computer 32, the voice activated switching signal generated by MCU 26—which represents or identifies a particular workstation—is also recorded. As a conference call is initiated, the user at each workstation will identify him or herself to the MCU. When a single user is at a workstation, the switching signal representing the location of that workstation will also uniquely identify the individual user at that workstation. The present invention thus provides automatic indexing of the recorded information wherein video, audio and data received by each workstation is so designated.

For example, when MCU 26 switches between video information corresponding to detected audio signals, such as an audio signal detected at workstation 12a, a location signal is provided to computer 32 for alerting the computer that the audio signal which follows, as well as the video information and data, is originating from workstation 12a. When a different audio signal is thereafter detected by MCU 26, a new location signal is generated which alerts computer 32 that the audio, video and data information that follows originates from the workstation from which the newly-detected audio signal was received and not from workstation 12a. In this manner, an archive file of a multimedia video conference is created wherein indexing is automatically and dynamically performed to correlate information input at each particular workstation that is involved in the conference with the location of that workstation so as to facilitate the subsequent locating and retrieval of recorded information by way of a variety of categories such, for example, as by topic, speaker identity, etc.

In addition and as explained above, all or a portion of the video signal generated or originating at each workstation can be recorded so that a visual representation of the location site of the particular workstation from which the detected audio signal originates—which will typically and most commonly comprise the visual image of a conference participant—will likewise be stored in the computer for subsequent retrieval along with the audio and data signals associated with the stored video images. Thus, the present invention provides for ready locating and retrieval of recorded audio information and data together with the corresponding video information so that, for example, each conference participant's facial expressions and other movements can be observed in conjunction or correspondence or association with an audio or text representation of that participant's statements, etc.

The inventive method and device hereinabove described has thus far been discussed in the context of a single individual user or participant being present at each connected workstation. In this scenario, after an initial identification of each individual user, a stored or recorded signal monitoring the location of a workstation will directly correspond to and uniquely indicate the identity of the individual participant. However, it is also contemplated and within the scope of the invention that two or more users may share a common workstation during a multimedia conference. In such instances, the voice activated switching feature of the MCU will be unable to distinguish between the individual co-users present at a single workstation. In accordance with the present invention, therefore, the user identification process may further include a vocal identification feature whereby each user is identified by workstation and/or by matching of the user's voice with a pre-stored voice pattern or voice print of that user. With two or more users present at a single workstation, the MCU will in this manner be capable of distinguishing between these plural users, by employing their respective voice prints, and of generating a signal to be recorded by computer 32 for correlating each specific user at a particular workstation with that user's respective statements in the course of the conference.

Figure 2:
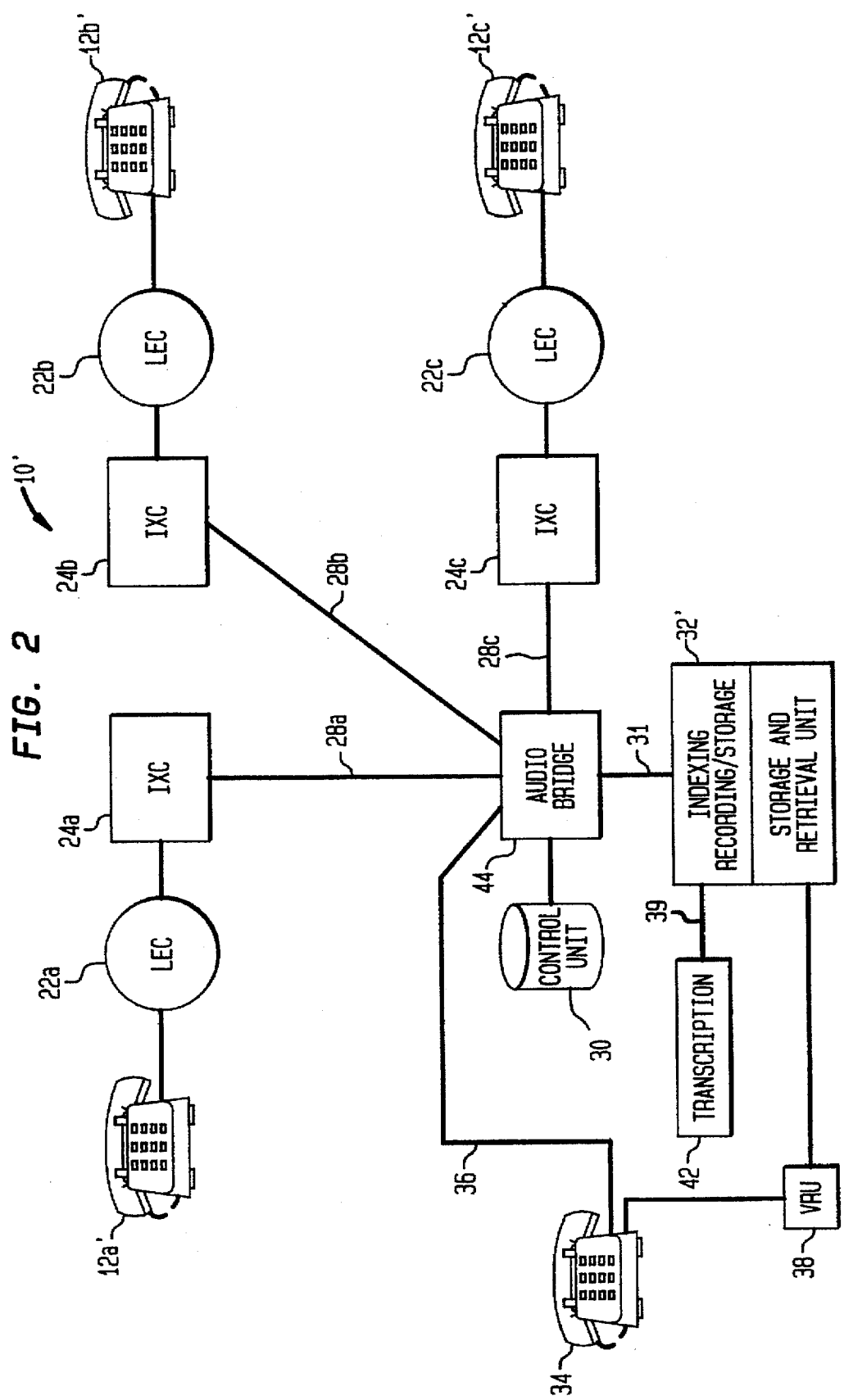
FIG. 2 is a block diagram of an apparatus for indexing and recording an audio conference in accordance with another preferred embodiment of the invention.

With reference now to FIG. 2, an alternate embodiment of the present invention will now be described. The device depicted in FIG. 2 is a block representation of an apparatus 10' for recording and indexing a three-way audio only, i.e. telephone, conference call. The block diagram of apparatus 10' depicted in FIG. 2 is similar to the block representation of the apparatus 10 depicted in FIG. 1 with the following exceptions. Specifically, the workstations 12a, 12b and 12c have been replaced with terminal devices having no video capability such, for example, as telephones 12a', 12b' and 12c'. The telephones interact with each other through their respective connection lines 28a, 28b and 28c which connect to a common audio bridge 44. Again, and as explained above when describing the multimedia conference apparatus 10, each telephone can either be connected directly to the audio bridge 44 or, depending on the type of call, i.e. local or long distance, can be connected to the audio bridge through their respective local central offices 22 and/or long distance switching offices 24. The audio bridge 44 is essentially a bridging connection allowing participants at each telephone to speak with and hear all of the others during a telephone conference.

Like apparatus 10 of FIG. 1, and with continued reference to FIG. 2, apparatus 10' is provided with conference control unit 30 for reserving the required number of audio bridge ports to which the lines 28 and their respective telephones are connected. In addition, an audio add-on line 36 may be provided for allowing access to an ongoing audio conference by an additional participant utilizing the additional telephone 34. Also as shown, the audio bridge 44 is connected to a computer 32' via silent leg 31 for recording, indexing and storing the audio information exchanged during the conference call to accommodate subsequent access and use, in a manner more fully described hereinbelow.

At the commencement of an audio conference call with all the telephones 12' connected to the audio bridge 44, the address or location of each telephone is determined by the computer 32'. By utilizing known voice identification or voice printing techniques employed by the computer 32', or by otherwise requiring that each conference participant expressly identify her or himself to the computer, the identity of each speaker or participant can be determined. When the individual conference participant at telephone 12a' is speaking and the corresponding audio signal thereby generated is recorded and stored by the computer 32', a signal representing the address or location of telephone 12a' is recorded and stored with the audio signal. When a single conference participant is at each telephone, the address signal will correspond with or uniquely indicate the identity of the speaking participant. Thus, the audio signal generated from telephone 12a' can be stored for subsequent retrieval, along with the address of the receiving telephone 12a' and the speaker's identity, in computer memory or storage located either in computer 32' or at a remote memory location. Once the participant at telephone 12a' ceases speaking and another participant (e.g. a participant at telephone 12b') begins speaking, the computer 32' will record the resulting audio signal along with an address signal identifying the source of the new audio signal, i.e. telephone 12b', and the identity of the new speaker.

In addition, once the various participants to an audio conference call are identified by computer 32' a previously-stored or associated digital pictorial representation of each participant may be retrieved and stored together with each participant's audio signal and address signal so that, when the recorded archive record is subsequently accessed, as by obtaining a printed text representation of a recorded conference, a pictorial representation of each speaking participant may be included at the beginning of the printed text of such participant so that users of the printed material can familiarize themselves with the appearances of and thereby better and more readily identify the conference participants.

Like the multimedia conference feature discussed hereinabove wherein two or more individual conferees are located at a single workstation, it is also contemplated and within the intended scope of the invention that two or more conferees may share a common telephone, such as a speaker phone, etc., in an audio conference. In such instances, the voice identification feature will enable the computer 32' to distinguish between the multiple users at a telephone device so that the recorded audio information may be indexed to reflect the identity of the corresponding individual speaker.

Referring again to FIG. 1, and as previously pointed out, the information transmitted to and from MCU 26 during a multimedia conference call generally contains audio components, video components and may also include data components as where documents or computer files are accessed during the conference by the users or conferees. Because the video component of the information is formed of a relatively large amount of data—i.e. large bit strings defining a continuous stream of image frames containing the video information—it may be undesirable or impractical to store the entire video bit stream containing the video information which would occupy an immense or unavailable amount of storage space in the memory of digital computer 32 or in a separate or associated memory unit. In addition, since at least most of the video information input to MCU 26 during a typical multimedia conference consists primarily of images of the conferees speaking at their respective workstations, it is usually unnecessary to record the entire video information stream because the images input to video camera 20 at each workstation 12 will not significantly vary during a particular segment—i.e. the period during which video signals from one of the workstations 12 is being broadcast for display to the other participating workstations. Accordingly, as it is usually neither necessary nor desirable to store the entire video information stream obtained from a video conference call, various software-based (for example) sampling techniques may optionally be employed by or at the digital computer 32 for reducing the amount of video signal for storage by the computer while still maintaining an accurate video representation of the video information exchanged during a conference call.

Such sampling techniques—which are well known to those of ordinary skill in the art—may include, by way of example, temporal or spatial sampling or compression methods for sampling the video signal at certain predetermined rime intervals. Thus, and especially in a video conference call in which the video signal is comprised primarily of images of the speaker participants and wherein there is little movement from frame to frame, time sampling at predetermined intervals will provide a sufficiently detailed and accurate representation of the continuous video signal provided by the video camera 20. As an alternative, and particularly for use where the video image contains numerous frame changes resulting, for example, from repeated or frequent participant movements at a video camera location, content-based sampling methods known in the art—wherein the number of samples of the video signal needed to obtain an accurate representation may depend, for example, on the amount and frequency of movement at the workstation—may be employed.

Irrespective of the particular video sampling technique(s) that may be used to reduce the amount of video-related storage or memory space, the voice activated switching capability of the MCU 26 will, in accordance with the invention, index the recorded information so as to identify the particular workstation and the user(s) thereat which input(s) the information. Thus, by utilizing the voice activated switching capabilities of the MCU of the invention, an indexed archive of a video conference is readily obtained.

In a preferred embodiment, the software used by digital computer 32 for recording or storing the information from a multimedia conference call contains a rime stamping feature which marks or designates associated or corresponding video, audio and data with a common time stamp that may be synchronized with a network clock fed to the MCU 26 via the clock input 40. When such rime stamping techniques are employed, the separate video, audio and data information may be respectively stored in separate locations in memory and/or in discrete storage devices whereby the corresponding information can be nevertheless retrieved and correlated by the common time stamp designation. The MCU may also be provided with the further capability of accommodating an additional conferee participating via the conventional, voice-only telephone 34 connected to the MCU 26 through audio add-on line 36. Although the telephone participant will have no video interaction with the other participants of the conference, once the telephone participant is identified to the MCU a still image or photograph of that added participant may be retrieved from a database and displayed on the other participants' screens 14 when the telephone participant is speaking.

For both the apparatus 10 of FIG. 1 and the apparatus 10' of FIG. 2, telephone 34 may also provide access, when used in conjunction with a conventional voice response unit (VRU) 38 which is connected to the computer 32 or 32' via a modem (not shown) as is known in the art, for obtaining desired pre-recorded conference information from a menu of options offered by the VRU. Thus, with the conference information recorded and stored in a readily accessible and workable standardized format, the recorded information can be accessed through the VRU 38 for compatible display or processing by the accessor's equipment. For example, where the accessor does not have video capability at his workstation, the accessor may only receive data, audio and/or text (in the form of a transcript of the audio information) from the stored multimedia conference record. Such an accessor may additionally request, via an option offered by VRU 38, a printout of the statements made by one of the participants in the conference and have that printout automatically forwarded to a designated facsimile machine or other terminal device. The printout may also optionally contain a pictorial representation of the video signal as, for example, a visible representation of the speaker. Of course, if the accessor does have video capability, then video information can be retrieved as well. For a recording of an audio-only conference, however, the VRU will provide access only to audio information and a text representation thereof, as no video information is present.

In addition, apparatus 10 may be equipped with another silent leg output line 39 to interface a transcription unit 42 with MCU 26 so that a transcript of the video conference can be readily obtained. The transcription unit 42 will for example receive the audio signal, convert the audio signal to a text format and, by utilizing the location signal generated by the MCU, generate a transcript or record of the conference wherein an indication of each speaker's identity is provided with that speaker's statements. The transcription unit 40 can also be used in conjunction with apparatus 10'. However, since the location signal is generated by the digital computer 32' as opposed to the audio bridge 44, the transcription unit 40 will be connected directly to the computer via silent leg output line 39'. Still other advantageous options and features are within the intended scope and contemplation of the invention and will be readily apparent to those having ordinary skill in the art who have read the foregoing description.

Thus, while there have been shown and described and pointed out fundamental novel features of the invention as applied to currently preferred embodiments thereof, it will be understood that various omissions and substitutions and changes in the form and details of the method and apparatus illustrated, and in their operation, may be made by those skilled in the art without departing from the spirit of the invention. It is the intention, therefore, to be limited only as indicated by the scope of the claims appended herewith.

What is claimed is:

1. A method for recording and indexing information exchanged during a multimedia conference having a plurality of participants at a plurality of spaced apart terminal devices and interacting through a multimedia bridge connected to a computer, each of the terminal devices having audio input means for inputting an audio signal to the each terminal device, and at least one of the each terminal devices having a video input means for inputting a video signal to the at least one terminal device and a data accessing means for accessing stored data files during the multimedia conference, said method comprising the steps of:

detecting at the computer an audio signal input to the audio input means of the at least one terminal device;

identifying the at least one terminal device from which the detected audio signal originated and generating a location signal representative of the identified terminal device; and recording the detected audio signal, an address signal identifying any stored data file accessed during the multimedia conference by the at least one terminal device, at least a portion of the video signal and said location signal identifying the at least one terminal device from which the detected audio signal originated to correlate the recorded detected audio signal, the recorded portion of the video signal, the stored data file address signal and the recorded location signal with each other.

2. The method of claim 1, further comprising the step of determining an identity of each participant to the multimedia conference, and wherein said recording step further comprises recording a signal indicative of the determined identity.

3. The method of claim 1, further comprising the step of synchronizing the recorded location signal and at least one of the recorded portion of the video signal, the recorded data file address and the recorded audio signal to a reference clock signal by recording a representation of the reference clock signal in said recording step.

4. The method of claim 1, wherein a plurality of participants are present at said at least one terminal device, the method further comprising the steps of identifying from said detected audio signal a speaking participant of said plurality of participants at said at least one terminal device from whom the detected audio signal originates, and recording in said recording step a signal identifying the speaking participant.

5. The method of claim 1, further comprising the step of providing a transcription unit connected to the computer for generating a transcript of a multimedia conference by utilizing said location signal to correlate the recorded detected audio signal with the location of the terminal device from which the audio signal originated.

6. A method for recording and indexing information exchanged during a multimedia conference having a plurality of participants interacting with a multipoint control unit (MCU) through a plurality of terminal devices at spaced apart locations, each of the terminal devices having at least audio input means for inputting audio signals to the each terminal device, and at least one of the said each terminal devices having a video input means for inputting a video signal to the at least one terminal device and a data accessing means for accessing stored data files during the multimedia conference, said method comprising the steps of:

detecting at the MCU an audio signal input to one of the audio input means of the at least one terminal device;

identifying the at least one terminal device from which said detected audio signal originated and generating a location signal representative of the identified terminal device; and recording said detected audio signal, an address signal identifying any stored data file accessed during the multimedia conference by the at least one terminal device, at least portion of said video signal, and said location signal identifying the at least one terminal device from which said audio signal originated to correlate the recorded detected audio signal, the at least a portion of the video signal, the stored data file address signal and the recorded location signal with each other.

7. The method of claim 6, wherein at least one additional of said terminal devices further comprise video input means for inputting video information and wherein said detected audio signal is associated with video information input to the MCU from the at least one terminal device by the video input means of the at least one terminal device, said method further comprising the step of transmitting to said at least one additional terminal device, for as long as said detected audio signal continues, the video signal associated with said detected audio signal.

8. The method of claim 7, further comprising the step of synchronizing the recorded location signal and at least one of the recorded portion of the video signal, the recorded data file address and the recorded audio signal to a reference clock signal by recording a representation of the reference clock signal in said recording step.

9. The method of claim 8, further comprising the step of time stamping the recorded audio signal, the at least a portion of the video signal, the stored data file address signal and the recorded location signal for subsequent retrieval.

10. The method of claim 7, further comprising the step of sampling the video signal input from the video input means, and wherein said recording step further comprises recording the sampled video signal.

11. The method of claim 10, further comprising the step of synchronizing the recorded location signal, audio signal, address signal and sampled video information to a reference clock signal received by the multipoint control unit by recording a representation of the reference clock signal in said recording step.

12. The method of claim 11, further comprising the step of time stamping the recorded audio signal, location signal, address signal and sampled video information for subsequent retrieval.

13. The method of claim 10, wherein said recording step further comprises sampling the video in a content-based manner.

14. The method of claim 10, wherein said recording step further comprises sampling the video signal at a predetermined rate.

15. The method of claim 7, wherein a plurality of participants are present at said one terminal device, the method further comprising the steps of identifying from said detected audio signal which participant of said plurality of participants at said one terminal device is speaking, and wherein said recording step further comprises recording a signal identifying the speaking participant.

16. The method of claim 7, wherein a voice-only terminal device is connected to said multipoint control unit for participation in said multimedia conference by an additional participant at the voice-only terminal device, said method further comprising the steps of identifying a stored image of the additional participant and displaying the stored video image of the additional participant on the plurality of terminal devices having audio and video input means when the voice of the additional participant is detected by the MCU.

17. The method of claim 6, further comprising the step of providing a transcription unit connected to the MCU for generating a transcript of a multimedia conference by utilizing said location signal to correlate the recorded detected audio signal, the address signal and the at least a portion of said video signal, with the terminal device from which the audio signal originated.

18. An apparatus for recording and indexing information exchanged during a multimedia conference having a plurality of participants communicating through a plurality of terminal devices at spaced apart locations, each said terminal device having an audio input means and at least one of the terminal devices having video input means for inputting a video signal to the at least one terminal device and data accessing means for accessing stored data files, said apparatus comprising:

a multimedia bridge connected to said plurality of terminal devices for receiving an audio signal and a video signal from the audio input means and video input means, respectively, of the at least one of the plural terminal devices;

means connected to said multimedia bridge for generating a location signal identifying the at least one terminal device; and means connected to said multimedia bridge for recording said generated location signal, an address signal identifying any stored data file accessed during the multimedia conference by the at least one terminal device, at least a portion of the video signal, and the detected audio signal so as to correlate said detected audio signal, the address signal, the portion of the video signal, and the location signal identifying the at least one terminal device, with each other.

19. The apparatus of claim 18, further comprising means for synchronizing the recorded location signal, the address signal, the portion of the recorded video signal, and the recorded audio signal to a reference clock signal by recording a representation of the reference clock signal with the audio signal, the address signal, the video signal portion, and the location signal.

20. The apparatus of claim 18, further comprising means connected to said multimedia bridge for distinguishing between multiple participants present at a single one of the plurality of terminal devices using the audio signal originating at said single terminal device.

21. The apparatus of claim 20, wherein said generating means, recording means and distinguishing means comprise a digital computer.

22. The apparatus of claim 18, further comprising transcription means connected to said signal generating means for transcribing the recorded audio signal.

23. An apparatus for recording and indexing information exchanged during a multimedia conference having a plurality of participants communicating through a plurality of terminal devices at spaced apart locations, each said terminal device having at least an audio input means and at least one of the each terminal devices having a video input means for inputting a video signal to the at least one terminal device and a data accessing means for accessing stored data files during the multimedia, conference, said apparatus comprising:

a multipoint control unit (MCU) connected to said plurality of terminal devices, said MCU having means for detecting an audio signal and a video signal, respectively, input to said MCU from the audio input means of said at least one of the each terminal devices and for generating a location signal identifying the at least one terminal device; and means connected to said MCU for recording said generated location signal, an address signal identifying any stored data file accessed during the multimedia conference by at least one terminal device, at least a portion of said video signal and the audio signal so as to correlate said audio signal, address signal, portion of said video signal and location signal with each other.

24. The apparatus of claim 23, wherein at least one additional of said terminal device has video input means and wherein said detected audio signal corresponds to video information input to said MCU from the video input means of said at least one terminal device, said MCU further comprising means for providing, upon detection of said detected audio signal and for as long as said audio signal is detected, the video signal to at least the one additional terminal device.

25. The device of claim 24, further comprising means for synchronizing the recorded location signal, recorded address signal, recorded portion of said video signal and recorded audio signal to a reference clock signal by recording a representation of the reference clock signal with said audio signal, said location signal, said address and said video signal portion.

26. The device of claim 25, further comprising means for time stamping the recorded audio signal, location signal and video information for subsequent retrieval.

27. The device of claim 24, further comprising means for sampling the video information input from the video input means, and wherein said recording means records the sampled video information.

28. The device of claim 27, wherein said sampling means samples the video information in a content-based manner.

29. The device of claim 27, wherein said sampling means samples the video information at a predetermined rate.

30. The device of claim 24, wherein said video input means comprises a video camera.

31. The device of claim 23, further comprising means connected to said multipoint control unit for distinguishing between multiple participants present at a single one of the plurality of terminal devices.

32. The device of claim 24, further comprising a connection line connected to said MCU for connecting a voice-only terminal device to said MCU for facilitating multimedia conference participation by a user of the voice-only terminal device.

33. The device of claim 24, further comprising transcription means connected to said MCU for transcribing the detected audio signal input to said MCU during a multimedia conference.

* * * * *